United States Patent [19]

Bridgeford

[11] 3,987,220

[45] Oct. 19, 1976

[54] PROCESS FOR IMPROVING THE VAPOR BARRIER PROPERTIES OF ARTICLES SHAPED FROM POLYMERS HAVING CARBOXYLIC ACID SALT GROUPS

[75] Inventor: Douglas J. Bridgeford, Champaign, Ill.

[73] Assignee: Tee-Pak, Inc., Chicago, Ill.

[22] Filed: Mar. 24, 1975

[21] Appl. No.: 558,406

[52] U.S. Cl. .............................. 427/322; 427/400; 427/407 E; 427/407 C; 428/35
[51] Int. Cl.$^2$ ...................... B05D 3/10; B32B 27/32
[58] Field of Search ........... 427/322, 400, 333, 337, 427/302, 407 C, 407 E; 260/DIG. 31

[56] References Cited
UNITED STATES PATENTS

| | | | |
|---|---|---|---|
| 2,801,447 | 8/1957 | Wolinski | 427/322 X |
| 3,267,083 | 8/1966 | Imhof | 260/DIG. 31 |
| 3,338,739 | 8/1967 | Rees | 260/DIG. 31 |

FOREIGN PATENTS OR APPLICATIONS

| | | | |
|---|---|---|---|
| 1,025,675 | 4/1966 | United Kingdom | 427/322 |

*Primary Examiner*—Ralph Husack
*Attorney, Agent, or Firm*—Paul Shapiro; Joseph E. Kerwin; William A. Dittmann

[57] ABSTRACT

This invention relates to a process for improving the vapor barrier properties of a shaped article having relatively poor vapor barrier characteristics, said article shaped from a polymer having a plurality of carboxylic acid salt groups formed by the reaction of pendant carboxylic acid groups and a cation which comprises:

displacing at least a portion of the cations in said polymer by contacting the surface of said shaped article with an effective proportion of an acid having a sufficient degree of ionization and for a time to displace said cation, thereby generating pendant carboxylic acid groups;

coating the contacted surface of said shaped article with an organic polyisocyanate;

bonding said organic polyisocyanate to said shaped article by reacting the isocyanate groups with said pendant carboxylic acid groups; and applying a coating having vapor barrier characteristics to said shaped article.

10 Claims, No Drawings

PROCESS FOR IMPROVING THE VAPOR BARRIER PROPERTIES OF ARTICLES SHAPED FROM POLYMERS HAVING CARBOXYLIC ACID SALT GROUPS

BACKGROUND OF THE INVENTION

Thermoplastic polymers made from a variety of monomers having carboxylic acid groups have been prepared and crosslinked via the carboxylic acid sites by means of a cation, e.g., a monovalent or polyvalent metal. Typically, the polymers are the polymerization product of an olefin, e.g., ethylene or propylene, and an unsaturated carboxylic acid, e.g., acrylic or methacrylic acid. These polymers then are crosslinked with a polyvalent metal, e.g., zinc, or effectively crosslinked with a monovalent metal, e.g., sodium. Such polymers have been used widely for the manufacture of shaped and molded articles, e.g., bottles, for the containment of aqueous mixtures or solutions, e.g., detergents, mouthwash, shampoo, and soap. One of the undesirable features of shaped articles made from these polymers is that the articles have a tendency to collapse when stored for an extended period of time, e.g., 3–9 months. The apparent collapsing of the shaped articles is caused by the escape of vapor or moisture from the container. Another undesirable feature of the article, although along the same line as the previous, is that the product often was degraded due to oxygen contamination.

DESCRIPTION OF THE PRIOR ART

Attempts have been made to improve the vapor barrier properties of shaped articles made from such polymers by applying a topcoating over the shaped article. The topcoating was of the type that had excellent vapor barrier characteristics. These attempts were without success because the coating did not adhere to the surface of the shaped article. The coating had a tendency to peel from the surface of the shaped article thereby rendering it undesirable from a functional point of view and also from an aesthetic viewpoint.

SUMMARY OF THE INVENTION

A process has been found for improving the vapor barrier properties of a shaped article made from a polymer having a plurality of carboxylic acid salt groups formed by the reaction of pendant carboxylic acid groups with a cation. The process for improving the vapor barrier properties of the shaped article comprise:

displacing at least a portion of the cation in said polymer by contacting the surface of said shaped article with an effective proportion of an acid having a sufficient degree of ionization for a time and in sufficient concentration for effecting said displacement, thereby generating said pendant carboxylic acid groups;

coating the contacted surface of said shaped article with a thin film of organic polyisocyanate;

bonding said organic isocyanate to said shaped article by reacting the isocyanate groups with the pendant carboxylic acid groups; and applying a coating having vapor barrier characteristics to the surface of said shaped article.

The advantages of this process include: the utilization of a commercially acceptable polymeric material for the manufacture of inexpensive shaped articles which have excellent resistance to moisture and vapor loss; the utilization of a polymer material which inhibits oxygen degradation of the product contained in the shaped article; and the ability to manufacture shaped articles having irregular shape having outstanding vapor barrier characteristics after molding.

DESCRIPTION OF THE PREFERRED EMBODIMENTS

The polymers suited for practicing this invention, in terms of manufacturing a shaped article, are those conventionally used in the manufacture of container materials adapted for the packaging of liquid emulsions, dispersions, and solutions. These polymers are further characterized in that they are made by the polymerization of a monomer having pendant carboxylic acid groups with other monomers, e.g., vinyl and olefinic monomers. The polymers may also be a homopolymer of the monomer having pendant carboxylic acid groups. The polymers are further characterized in that they should have at least one carboyxlic acid group per 1,000 molecular weight of polymer and preferably the carboxylic acid groups are present in a proportion of from about 1 carboxylic acid group per 50 molecular weight units of polymer to about 1 carboxylic acid group to about 600 molecular weight units of polymer.

The polymers when molded into shaped articles are crosslinked or "effectively crosslinked" by the conversion of the carboxylic acid group to a salt. This is accomplished by reacting the carboxylic acid group with a cation. Typically, the salt is formed by milling a metal oxide with a polymer for facilitating crosslinking of the polymer. Crosslinking of the polymer by milling the metal oxide with the acid-containing polymer lends rigidity to the molded article and provides for other advantageous properties. Typical cations or metals suited for crosslinking the polymer include: divalent metals such as calcium, magnesium, and zinc. The polymer may be effectively crosslinked by the reaction with a monovalent metal, e.g., the alkali metals sodium, potassium, lithium, and ammonium.

In a preferred embodiment, the shaped articles of this invention are of the type derived by the polymerization of an olefinic material with an alpha-beta mono or di-unsaturated carboxylic acid. Preferably, the olefin is ethylene or propylene and the alpha-beta unsaturated carboxylic acid is a mono-unsaturated carboxylic acid, e.g., acrylic or methacrylic acid. Such polymers commonly are sold under the trademark "Surlyn" by E. I. du Pont de Nemours and Company and comprise from about 70–95% olefin and the balance comprising acrylic or methacrylic acid. Further, these polymers are crosslinked with zinc or effectively crosslinked with sodium.

The surface of shaped articles made from the Surlyn polymers can be rendered extremely receptive for receiving an isocyanate which has excellent bonding characteristics to coatings having resistance to vapor transmission. The surface of the shaped article is rendered receptive for receiving the isocyanate by displacing at least a portion of the cation in the polymer by contacting the surface of the shaped article with an acid having an effective degree of ionization for a time sufficient to displace the cation. In the displacement step, the carboxylic acid salt groups are converted to carboxylic acid groups. The formation of carboxylic acid groups pendant from the polymer surface provides sites which are capable of reaction with isocyanate groups. This permits the application of a coating having excellent adhesion characteristics to the surface of the article.

The acid suited for displacing the cation from the polymer should be in contact with the surface of the shaped article and at such concentration for a time sufficient to displace a substantial proportion of the cation in the surface layer of the polymer and generate carboxylic acid groups for effecting bonding of the isocyanate coating to the surface. To accomplish the displacement of the cation, the acid used must be able to displace at least an equivalent amount of cation to that displaced by a 0.5 normal HCl solution in contact with the surface of the body for a 30 second period at 70° F. Preferably, the amount of cation displaced in the surface layer of the polymer is at least equivalent to the amount of cation displaced by a 0.5 normal HCl solution in contact with the surface of the article for a 2 minute period at 70° F.

Virtually any acid meeting this test can be used for displacing the cation on the surface provided that it does not cause adverse deterioration of the polymer. Generally, aqueous mineral acids are used for displacing the cation and are employed in concentrations of about 0.001–2 normal. The mineral acids preferred for practicing the invention include hydrochloric, nitric, sulfuric, sulfurous, and phosphoric. On the other hand, organic acids can be used for displacing the cation but generally for reasons of efficiency and economy are not employed.

Although the preferred method for displacing the cation in the polymer is by contacting the surface of the shaped article with an aqueous acidic medium in liquid form, the metal may be displaced by a vapor phase reaction caused by the generation of an acid in situ at the surface of the shaped article. Other techniques can also be employed. Typically, contacting of the surface of the shaped article is done by dipping the shaped article in the liquid and removing. It is also possible to brush or spray the acid over the surface of the container.

After the surface of the shaped article has been treated with an effective proportion of acid for displacing desired proportions of cation, the surface of the shaped article is coated with an organic polyisocyanate. The isocyanate can react with the carboxylic acid groups generated on the surface to provide a chemical bond by effecting substantial adhesion between the isocyanate coating and the surface of the shaped article. Examples of isocyanates which can be used for practicing this invention are noted in my earlier U.S. Pat. No. 3,005,728 and the subject matter of that patent is incorporated by reference. The isocyanates suited for practicing the invention include: aromatic isocyanates such as toluene 2,4-diisocyanate, and toluene 2,6-diisocyanate; alkylarylisocyanate such as diisocyanato diphenyl methane or triisocyanato triphenyl methane; aliphatic isocyanates such as stearyl isocyanates, napthyl isocyanates, substituted aromatic isocyanates such as meta-nitrophenyl isocyanates, and the like. Quite often, the isocyanates are converted to a polymer by reacting the isocyanate with a polyol, e.g., a glycol or triol. Examples of polyols suited for the manufacture of polymeric polyisocyanates include: ethylene glycol, trimethylolpropane, glycerin, and propanediol.

The isocyanate coating composition can be applied in conventional manner. Often, it is advantageous to coat the surface with an emulsion comprising a solvent or liquid carrier in combination with the organic isocyanate by dipping the shaped article into an emulsion bath. Of course, the coating can be sprayed or brushed over the surface of the shaped article. The solvent or liquid carrier used for forming the emulsion or coating composition should be of the type that will not adversely affect the physical properties of the polymer and it should permit uniform coating of the surface of the shaped articles. Often, the surface of the shaped articles have a tendency to be hydrophobic and aqueous emulsions of organic isocyanates, in the absence of surfactants or appropriate liquid carrier, have a tendency to "island" on the surface of the shaped article. Accordingly, it is advantageous to use an appropriate liquid carrier which facilitates complete coating of the surface of the shaped article and as a thin film or layer.

The coatings having vapor barrier characteristics should have a gas transmission rate of not more than 1 cc vapor/100 sq. cm./24 hour-atm. at 60° F. Such a coating when applied to the surface of the shaped article will permit the retention of liquids in the container for an extended period of time, e.g., 6–9 months, without substantial release of liquid or vapor. Examples of coatings having vapor barrier characteristics include: polyethylene, polypropylene, vinyl chloride, vinylidene chloride polymers and copolymers, rubber hydrochloride, and the like. The preferred coatings comprise a copolymer of vinylidene chloride, e.g., vinylidene chloride and acrylonitrile or vinylidene chloride and vinyl chloride.

The coatings having vapor barrier characteristics can be applied to the surface of the bottle either simultaneous with the coating with the organic isocyanate or as a separate topcoat. In the latter instance, the surface of the shaped article is primer coated with the organoisocyanate and then coated with the composition having vapor barrier characteristics. Either technique, i.e., simultaneous coating or primer coating followed by topcoating, can be accomplished by well known techniques.

The thickness of the barrier coating, including the primer coat, can be varied as desired. Generally, the combined thickness of the barrier and primer coat film is about 0.1–2 mils. Although thicknesses greater than 2 mils can be employed, they generally are not preferred for reasons of economy. On the other hand, barrier coatings having a thickness of less than 0.1 mil may have a tendency to be nicked or scratched.

The following examples are provided to illustrate preferred embodiments of this invention and are not intended to restrict the scope thereof. All percentages are expressed as weight percentages.

EXAMPLE 1

A small, irregular shaped bottle molded from a polymer comprising approximately 75 mole percent ethylene and 25 mole percent acrylic acid crosslinked by heat milling with zinc oxide, said polymer sold under the trademark Surlyn by E. I. duPont de Nemours and Company, was coated as follows. The bottle was dipped in an aqueous 0.5 N HCl bath at 25° C. for 30 minutes for displacing the zinc from the polymer surface. The bottle was removed, blotted dry with filter paper, and then coated by dipping the acid-treated bottle into a solution comprising 1% Mondur CB-75 by Mobay Chemical Company (a polyisocyanate made by reacting 3 moles toluene diisocyanate with 1 mole trimethylol propane), 10% Dow Saran F-300 (a polymer comprising 85 mole percent vinylidene chloride and 15 mole percent acrylonitrile), and 89% of a liquid carrier comprising 90 parts by weight methylethyl ketone and 10 by weight butyrolactone. The bottle was dipped in this solution, removed, and the liquid carrier evaporated by drying at 80° C. in a high air velocity Despatch oven for 30 minutes. This drying temperature was effective for reacting the isocyanate groups with the generated carboxylic acid groups to provide a chemical bond.

After curing, the bottle was evaluated for vapor barrier characteristics and adherence of the barrier coating to the surface of the bottle. At 62% relative humidity, it took four applications of "Scotch" tape to the scored surface of the coating in order to effect removal. When the vapor barrier coating of saran was applied to the non-acid treated bottle, only one application of Scotch tape to the scored surface was required to effect removal of the coating. Further tests in determining the bond strength of the coating to the surface of the shaped article were conducted and comprised steeping the bottles in water for 90 hours. The bottles showed no sloughing and had resistance to Scotch tape removal. Of course, the bottle had excellent resistance to moisture loss because of the excellent vapor barrier characteristics of the saran coating.

EXAMPLE 2

A small, irregularly shaped bottle was acid-treated in accordance with the procedure of Example 1. The bottle then was primer coated by dipping the acid-treated Surlyn bottle into a solution containing about 0.00225 weight parts Mondur CB-75 in 100 parts methylethyl ketone. The bottle was dipped in the solution for 10 seconds, removed, and the isocyanate coating bonded to the surface of the bottle by heating to 100° C. for 30 seconds. The primer coated bottle was topcoated by dipping the primer coated bottle into a solution containing 12% Dow Saran F-300, 1.2% Mobay Mondur CB-75, and the balance comprising a liquid carrier containing 90 parts by weight methylethyl ketone and 10 parts by weight butyrolactone. The topcoating had a thickness of about 0.42 mils while the intermediate coating was about 1/100 mil in thickness.

The bottle was tested for resistance to Scotch tape removal and vapor barrier characteristics. Excellent results were obtained. Moreover, there seemed to be no significant difference to Example 1 in terms of efficiency of barrier coating or resistance to coating peel from the surface of the shaped article.

EXAMPLE 3

The procedure of Example 2 was repeated except that the topcoat was applied by dipping the primer coated bottle into a solution containing 12% Saran F-300 in methylethyl ketone. The Mondur CB-75 was omitted in the topcoat. Testing showed the topcoat had excellent adhesion to the primer coat even though there was no clear basis for chemical bonding between the saran resin and the primer coat via an isocyanate group.

EXAMPLE 4

A small, irregular shaped bottle as described in Example 1 was washed with 0.5 N HCl for 10 seconds and removed. The organic isocyanate and vapor barrier coating were applied in the same manner as in Example 2. Poor bonding resulted between the primer coat and the bottle surface, in terms of the adhesion experienced in Example 2, although the adhesion was better than with an untreated bottle. Apparently, the 10 second acid treatment with 0.5 N HCl was insufficient for displacing a sufficient amount of cation and generating sufficient carboxylic acid groups at the surface to effect substantial bonding with the isocyanate coating.

EXAMPLE 5

An irregular shaped bottle molded from the Surlyn resins described in Example 1 was dipped in a 0.5 N sulfuric acid bath for 1 minute. The bottle was removed and permitted to air dry. A primer coat was prepared by first dissolving 2 g of p,p' diisocyanato diphenylmethane and 300 ml. of isoamyl acetate at 70° C. Then, 100 ml. of toluene was added to the solution, stirred for 5 minutes, and the resulting mixture filtered. The bottle then was dipped in the filtrate for about 1 second, removed, and heated to a temperature of 100° C. for 5 minutes. This permitted the primer coat to bond to the surface of the bottle.

A topcoat of polyethylene was applied over the primer coated bottle by dipping the primer coated bottle into a solution comprising 5% polyethylene and chloroform. The temperature of the bath was maintained at 50° C. The bottle then was removed from the polyethylene solution and dried.

Excellent adhesion of the polyethylene was obtained on the bottle and the vapor barrier properties of the bottle were substantially superior to the untreated bottle.

EXAMPLE 6

A bottle made from a polymer consisting of 95 mole percent ethylene and 5 mole percent methacrylic acid effectively crosslinked with sodium was coated in the following manner. The bottle was dipped in a bath of 1 N aqueous nitric acid for 1 minute to effect displacement of the sodium. The bottle then was primer coated as in Example 5.

A topcoat coating composition was made by dissolving 7.6 g of a copolymer consisting of about 75% vinyl chloride and 15% acrylonitrile (mole percent) in 93.4 g acetone. The primer coated bottle was dipped into the solution, withdrawn, and dried at 80° C. for 25 minutes for effecting bonding of the isocyanate to the surface of the shaped article.

The topcoating, including the primer coat, had excellent adhesion to the bottle as shown by resistance to Scotch tape peel tests. The coating had excellent resistance to vapor transmission thereby improving the retention characteristics of the bottle.

EXAMPLE 7

Example 6 was repeated except that the topcoat consisted of a 4% solution of Pliofilm (a rubber hydrochloride) to the primer coated bottle in place of the vinyl chloride-acrylonitrile topcoat.

Excellent adhesion of the coating was obtained and the vapor barrier properties of the Surlyn bottle were dramatically improved.

I claim:

1. A process for improving the vapor barrier properties of a shaped article having relatively poor vapor barrier characteristics, said article shaped from a polymer having a plurality of carboxylic acid salt groups formed by the reaction of pendant carboxylic acid groups and a cation which comprises:
  displacing at least a portion of the cations in said polymer by contacting the surface of said shaped article with an effective proportion of an acid having a sufficient degree of ionization and for a time to displace said cation, thereby generating pendant carboxylic acid groups;
  coating the contacted surface of said shaped article with an organic polyisocyanate;
  bonding said organic polyisocyanate to said shaped article by reacting the isocyanate groups with said pendant carboxylic acid groups; and
  applying a coating having vapor barrier characteristics to said shaped article.

2. The process of claim 1 wherein said polymer has at least 1 carboxylic acid group per 1,000 molecular weight of polymer.

3. The process of claim 2 wherein said carboxylic acid groups are present in said polymer in a proportion of from about 1 per 600 molecular weight of polymer to about 1 per 50 molecular weight of polymer.

4. The process of claim 3 wherein said shaped article is made from a polymer comprising about 70–95 mole percent olefin.

5. The process of claim 4 wherein said olefin is selected from the group consisting of ethylene and propylene.

6. The process of claim 5 wherein said polymer is a copolymer of said olefin and an alpha-beta unsaturated carboxylic acid.

7. The process of claim 6 wherein said acid used for displacing said cation is an aqueous mineral acid.

8. The process of claim 7 wherein said mineral acid is selected from the group consisting of hydrochloric, sulfuric, and phosphoric.

9. The process of claim 1 wherein said coating having vapor barrier characteristics is a vinylidene chloride polymer.

10. The process of claim 9 wherein said vinylidene chloride polymer comprises vinylidene chloride and acrylonitrile.

* * * * *